United States Patent
Lin et al.

(10) Patent No.: US 9,745,009 B2
(45) Date of Patent: Aug. 29, 2017

(54) CLAMPING DEVICE FOR A BICYCLE SADDLE

(71) Applicant: LEE CHI ENTERPRISES CO., LTD., Changhua (TW)

(72) Inventors: Yi-Hsiang Lin, Changhua (TW); Yu-Sheng Lin, Changhua (TW); Chin-Hung Lai, Changhua (TW); Rou-Yun Lin, Changhua County (TW)

(73) Assignee: LEE CHI ENTERPRISES CO., LTD., Changhua (TW)

( * ) Notice: Subject to any disclaimer, the term of this patent is extended or adjusted under 35 U.S.C. 154(b) by 32 days.

(21) Appl. No.: 14/795,471

(22) Filed: Jul. 9, 2015

(65) Prior Publication Data

US 2016/0009326 A1    Jan. 14, 2016

(30) Foreign Application Priority Data

Jul. 11, 2014    (TW) .............................. 103212414 U

(51) Int. Cl.
*B62J 1/08*    (2006.01)

(52) U.S. Cl.
CPC ...................................... *B62J 1/08* (2013.01)

(58) Field of Classification Search
CPC ....................................................... B62J 1/08
See application file for complete search history.

(56) References Cited

U.S. PATENT DOCUMENTS

| 5,228,796 A * | 7/1993 | Kao | B62J 1/08 248/231.31 |
| 5,295,727 A * | 3/1994 | Kao | B62J 1/08 248/180.1 |
| 5,333,826 A * | 8/1994 | Lai | B62J 1/08 248/229.14 |
| 5,501,506 A * | 3/1996 | Kao | B62J 1/08 297/215.15 |
| 5,749,622 A * | 5/1998 | Tseng | B62J 1/08 297/195.1 |
| 6,561,579 B1 * | 5/2003 | Weir | B62J 1/08 297/195.1 |
| 7,431,391 B2 * | 10/2008 | Hsiao | B62J 1/08 297/215.14 |
| 2009/0174237 A1 * | 7/2009 | Chen | B62J 1/08 297/215.13 |

(Continued)

FOREIGN PATENT DOCUMENTS

TW    M383516 U    7/2010

Primary Examiner — Timothy J Brindley
(74) Attorney, Agent, or Firm — Rabin & Berdo, P.C.

(57) ABSTRACT

A clamping device for a bicycle saddle has a seat post and a clamping assembly. The seat post has a post head having a head hole. The clamping assembly has two clamping bases, two clamping caps, and a clamping bolt assembly. Each clamping base has a clamping block, a threaded hole, and a rod clamping recess. The clamping caps are attached respectively to the outer sides of the clamping bases, and each clamping cap has a bolt hole and a rod clamping recess corresponding in position to the rod clamping recess of a corresponding one of the clamping bases. The clamping bolt assembly has a fixing bolt, a fixing sleeve screwed with the fixing bolt, and a spring. The fixing bolt and the fixing sleeve are mounted respectively through the bolt holes in the clamping caps and the through holes in the clamping bases.

11 Claims, 8 Drawing Sheets

(56) References Cited

U.S. PATENT DOCUMENTS

| | | | |
|---|---|---|---|
| 2010/0244509 A1* | 9/2010 | Chang | B62J 1/08 297/215.15 |
| 2011/0163515 A1* | 7/2011 | Cusack | B62J 1/04 280/283 |
| 2012/0027510 A1* | 2/2012 | Chen | B62J 1/08 403/374.2 |
| 2013/0113242 A1* | 5/2013 | Connors | B62J 1/08 297/215.13 |
| 2013/0119719 A1* | 5/2013 | Bigolin | B62J 1/007 297/215.14 |
| 2013/0228668 A1* | 9/2013 | D'Aluisio | B62J 1/02 248/629 |
| 2016/0023702 A1* | 1/2016 | Lin | B62J 1/08 297/215.15 |
| 2016/0176463 A1* | 6/2016 | McPherson | B62J 1/10 297/215.15 |

\* cited by examiner

CLAMPING DEVICE FOR A BICYCLE SADDLE

BACKGROUND OF THE INVENTION

1. Field of the Invention

The present invention relates to a clamping device, and more particularly to a clamping device for a bicycle saddle.

2. Description of Related Art

A conventional bicycle saddle is adjustably mounted on a seat post of a bicycle with a clamping device to make the angle of the saddle adjustable. A conventional clamping device substantially comprises two clamping caps clamping the saddle in a horizontal direction. TW Utility Model No. TW383516, entitled "Locking Device for a Bicycle Saddle", discloses two clamping members mounted respectively on two sides of an axial hole formed through an axle base formed on a top of a seat post. Two bolts are parallel to each other and are mounted through the clamping members. Accordingly, a rod on the saddle can be clamped by clamping sheets of the clamping members to hold the saddle in position.

In addition, a spring is usually mounted between the clamping sheets of the clamping members to provide a force to push the clamping sheets. Although the sheets can be kept abutting the axle base by the force provided by the spring during the process of assembling or dissembling the clamping device, the sheets are easily rotated during the process of assembling or dissembling the clamping device. Consequently, to assemble or to dissemble the conventional clamping device is troublesome. In addition, the saddle is easily detached from the seat post, so the process of adjusting the saddle is also inconvenient.

To overcome the shortcomings, the present invention tends to provide a clamping device to mitigate or obviate the aforementioned problems.

SUMMARY OF THE INVENTION

The main objective of the invention is to provide a clamping device for a bicycle saddle to assemble the clamping device with the bicycle saddle easily and to adjust the bicycle saddle conveniently.

The clamping device has a seat post and a clamping assembly. The seat post has a post head formed on a top of the seat post and having a head hole formed through the post head. The clamping assembly is mounted on the post head and has two clamping bases, two clamping caps, and a clamping bolt assembly. Each clamping base has an outer side opposite the outer side of the other clamping base, a clamping block, a threaded hole, and a rod clamping recess. The clamping block is inserted into one end of the head hole. The through hole is defined through the clamping base. The rod clamping recess is defined in the clamping base. The clamping caps are attached respectively to the outer sides of the clamping bases, and each clamping cap has a bolt hole and a rod clamping recess. The bolt hole is defined through the clamping cap. The rod clamping recess is defined in the clamping cap and corresponds in position to the rod clamping recess of a corresponding one of the clamping bases. One of the clamping caps further has a spring recess formed in a side of the clamping cap opposite the other clamping cap. The spring recess has an annular abutting flange formed in the spring recess. The clamping bolt assembly has a fixing bolt, a fixing sleeve screwed with the fixing bolt, and a spring. The fixing bolt and the fixing sleeve are mounted respectively through the bolt holes in the clamping caps and the through holes in the clamping base. The spring is mounted around the fixing bolt and abutting the annular abutting flange of the spring recess of the clamping cap in which the spring recess is defined.

Other objects, advantages and novel features of the invention will become more apparent from the following detailed description when taken in conjunction with the accompanying drawings.

DETAILED DESCRIPTION OF PREFERRED EMBODIMENT

Figure 1:
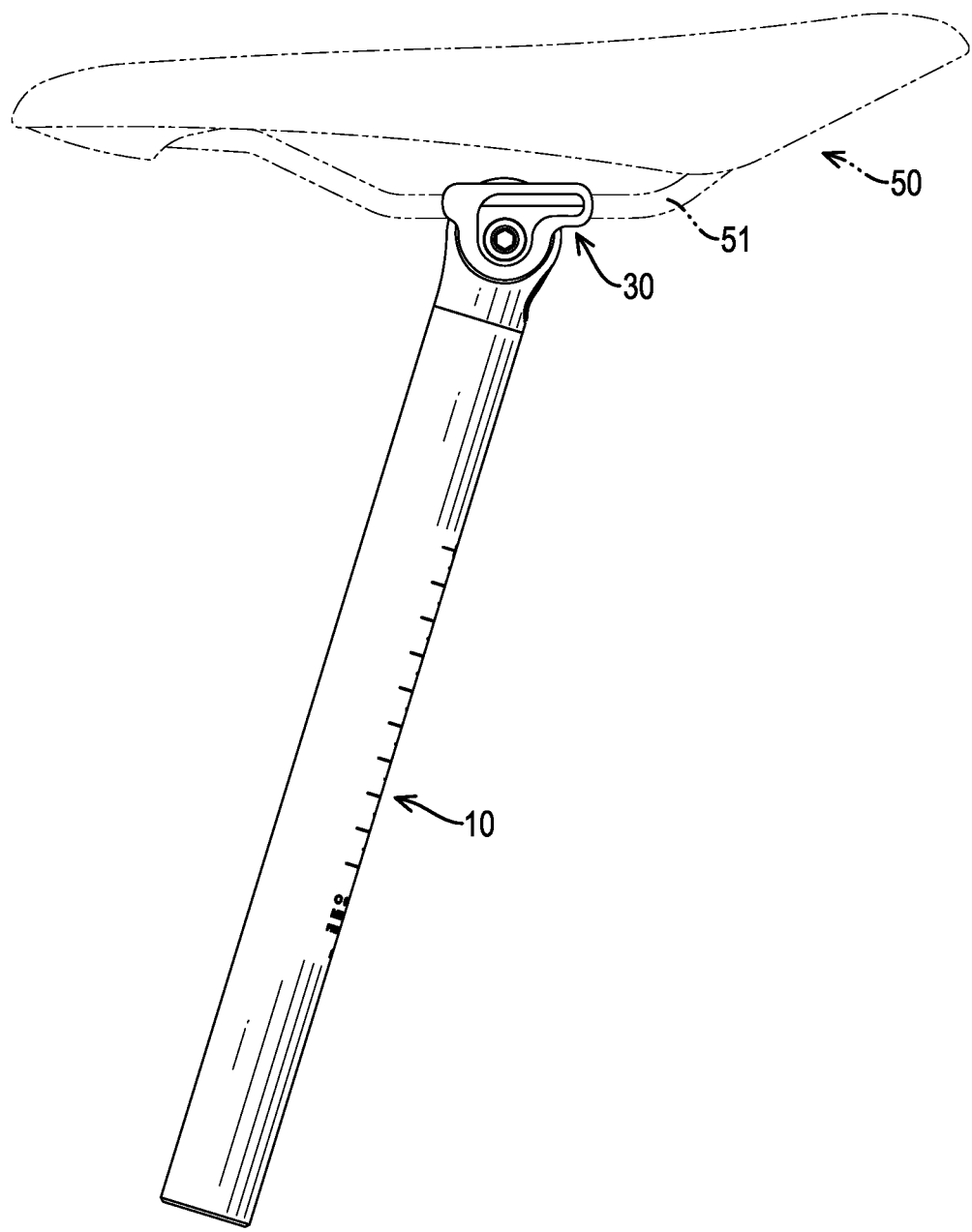
FIG. 1 is a perspective view of a clamping device in accordance with the present invention.
Figure 2:
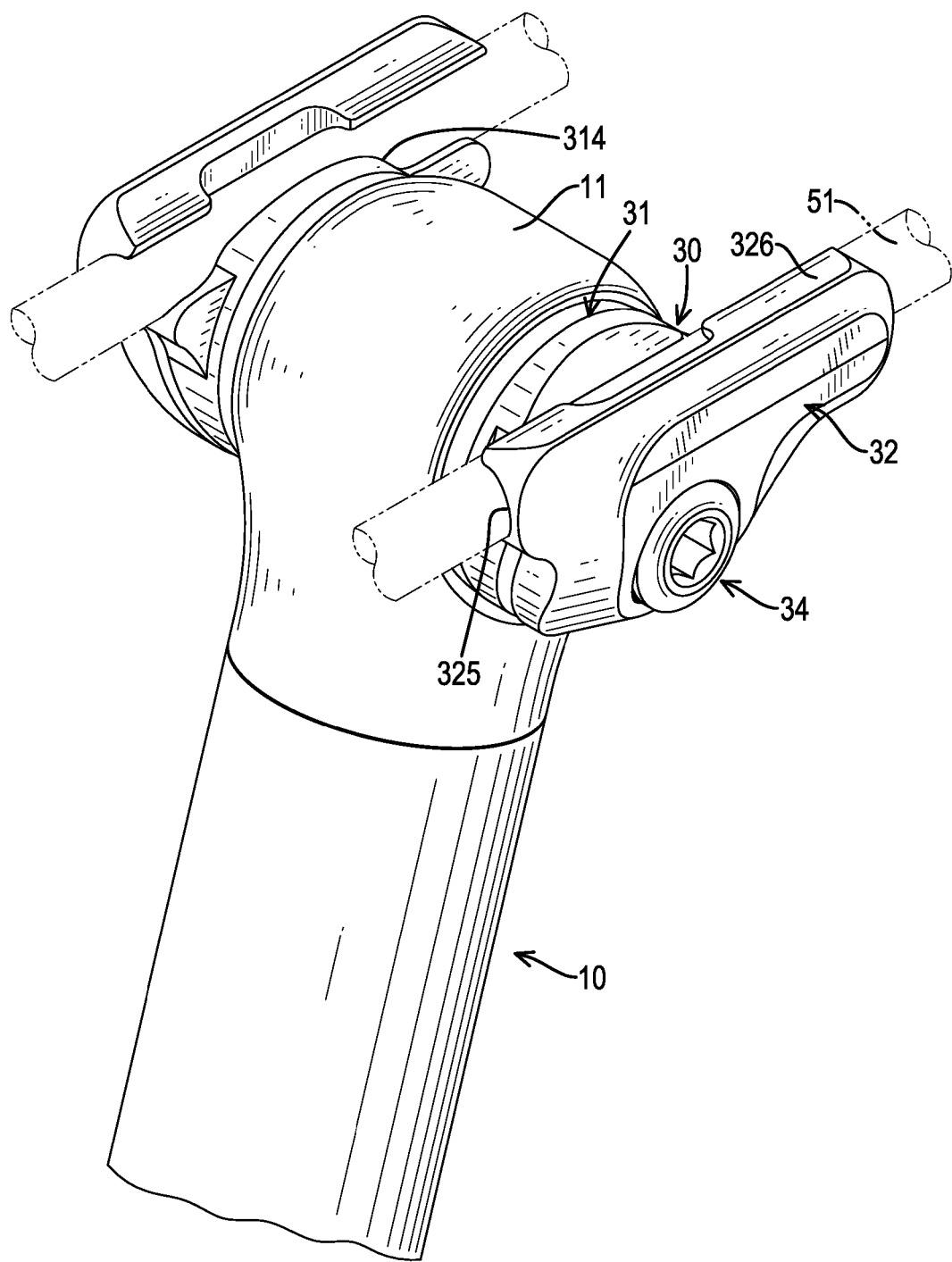
FIG. 2 is an enlarged perspective view of the clamping device in FIG. 1.
Figure 3:
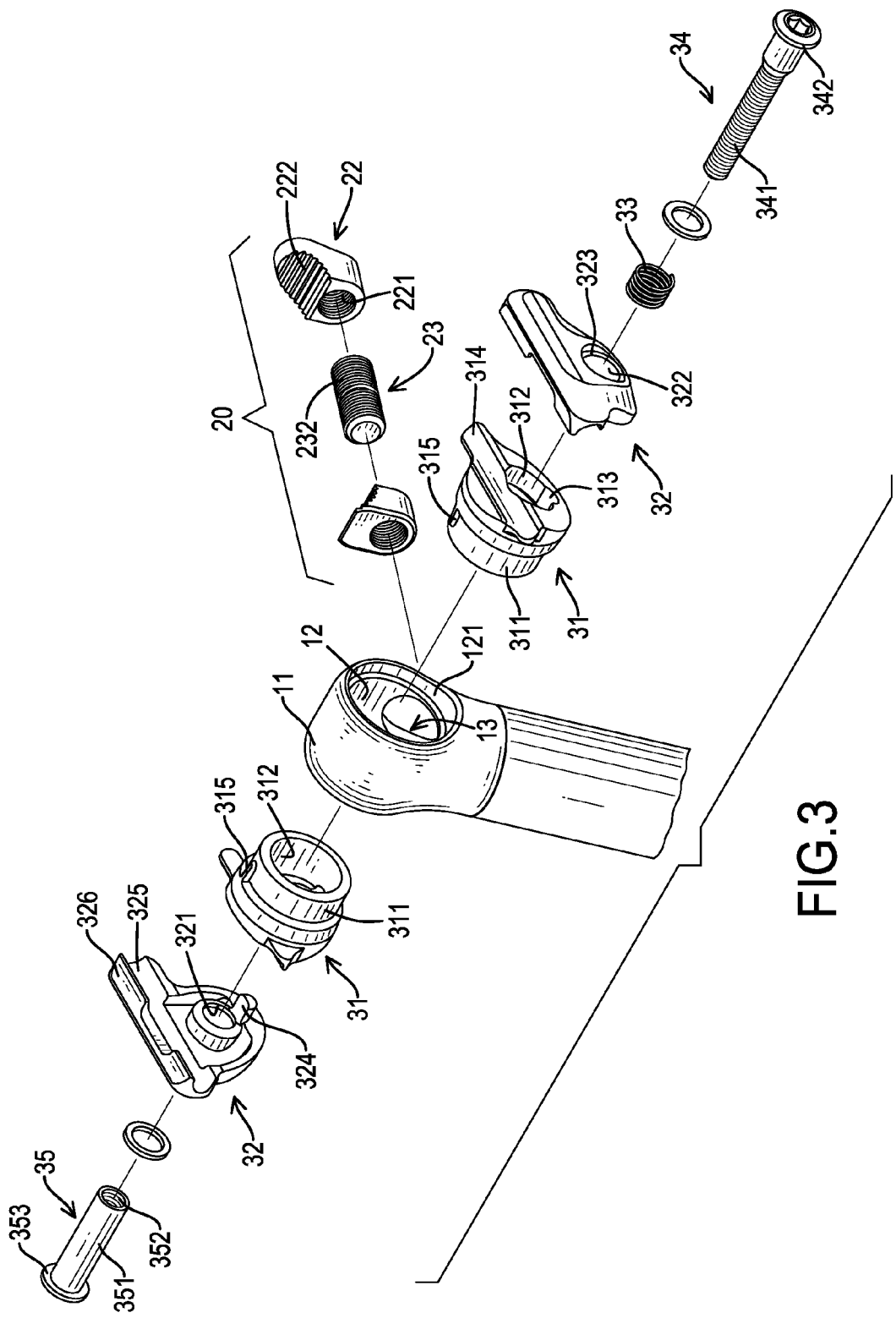
FIG. 3 is an exploded perspective view of the clamping device in FIG. 1.

With reference to FIGS. 1 to 3, a clamping device for a bicycle saddle in accordance with the present invention comprises a seat post 10, a pressing assembly 20 and a clamping assembly 30.

Figure 4:
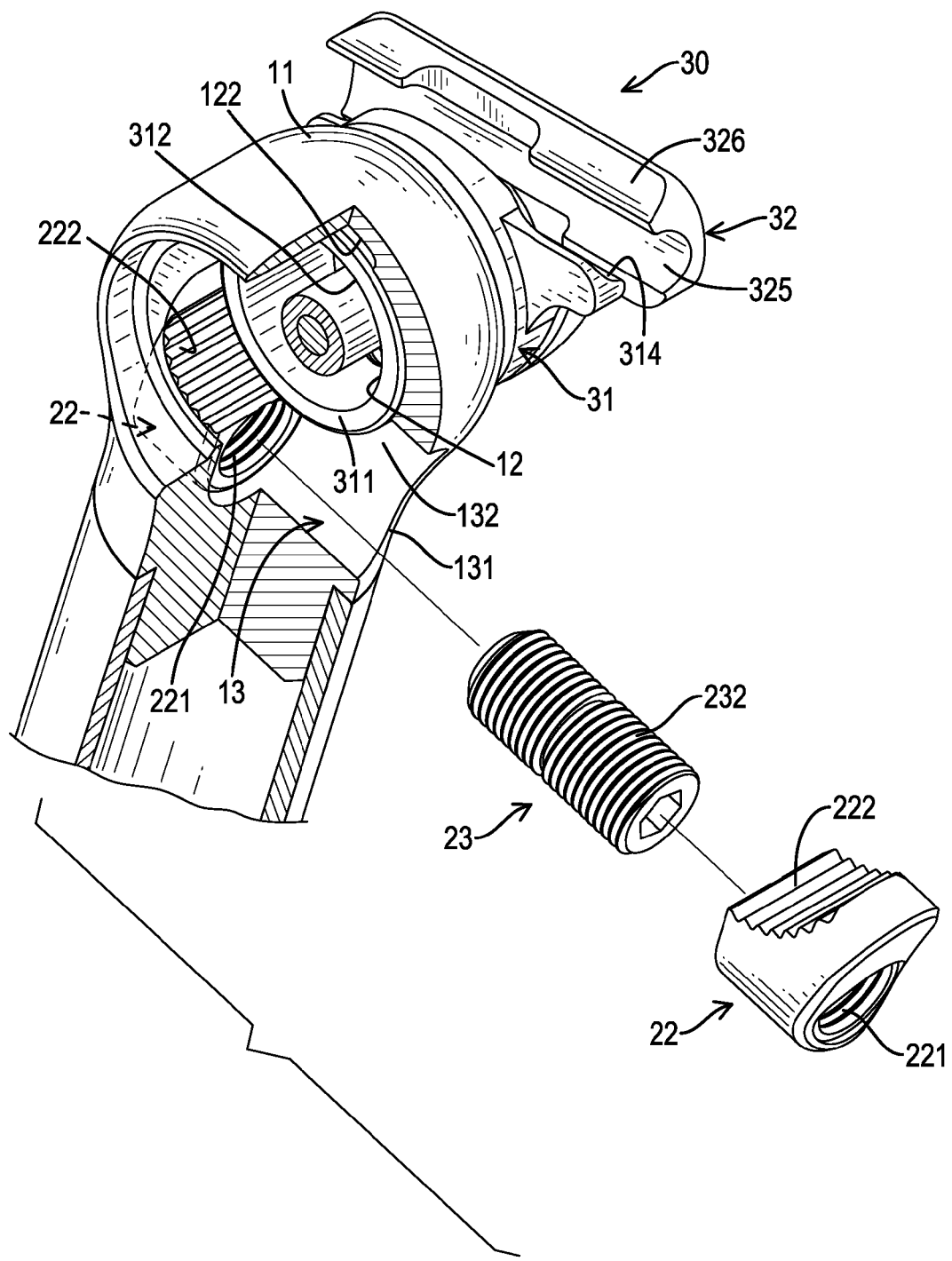
FIG. 4 is an enlarged exploded perspective view in partial section of the clamping device along the line 5-5 in FIG. 6.
Figure 5:
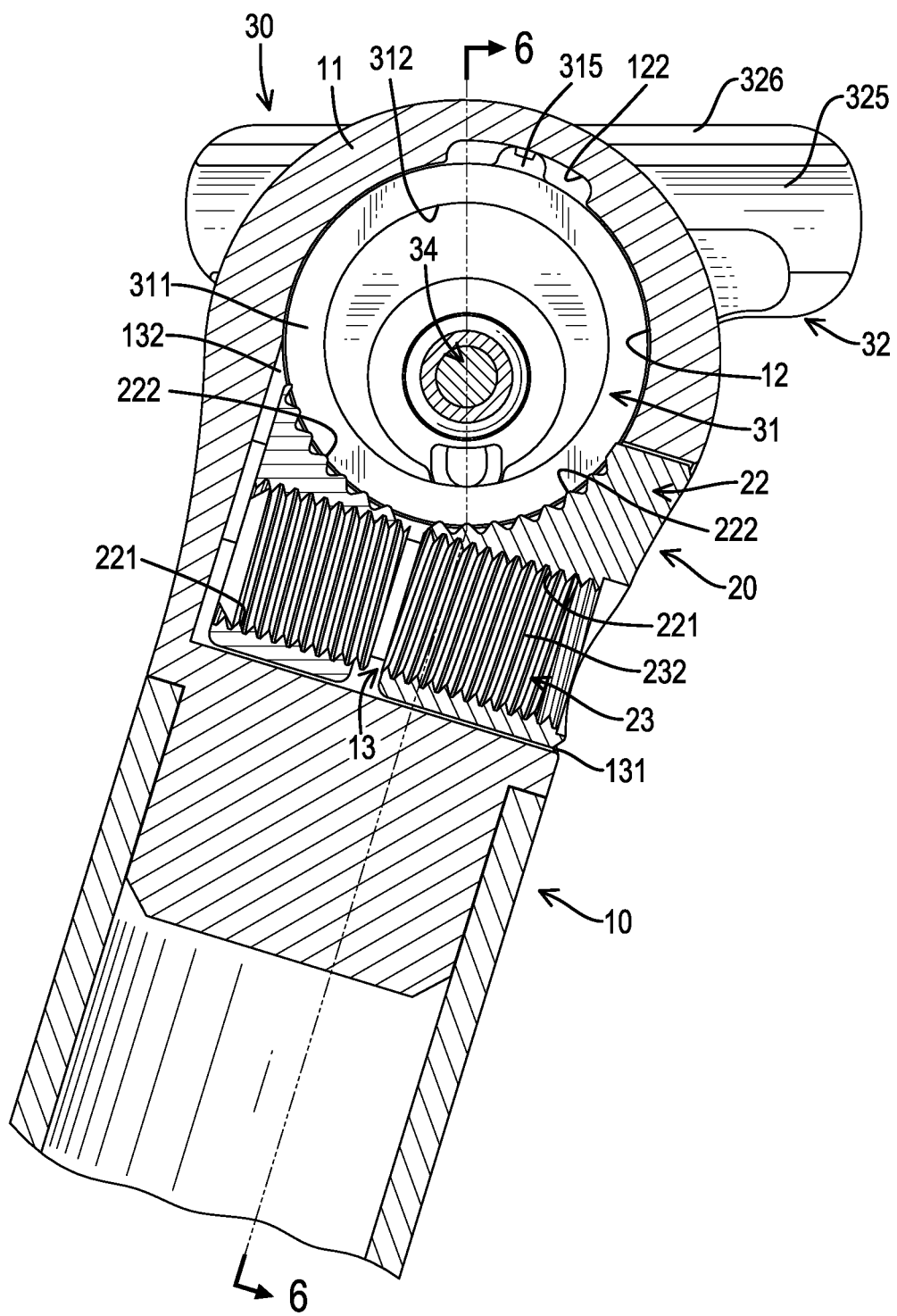
FIG. 5 is a side view in partial section of the clamping device in FIG. 1.

With reference to FIGS. 3 and 4, the seat post has a post head 11 and a pressing recess 13. The post head 11 is formed on a top of the seat post 10. Preferably, the post head 11 is formed integrally on the seat post 10 as a single part or is securely mounted on the top of the seat post 10. The post head 11 has a head hole 12 axially and horizontally formed through the post head 11. The head hole 12 has a diameter gradually increasing from a middle section respectively to two ends of the head hole 12. Two abutting flanges 121 are respectively formed on the ends of the head hole 12. With further reference to FIGS. 4 and 5, a limiting recess 122 is defined in an inner surface of the head hole 12. The pressing recess 13 is defined in the seat post 10, is located below the head hole 12, and communicates with the head hole 12. The pressing recess 13 has a width being equal to half of a length of the head hole 12. The pressing recess 13 extends to a rear part of an outer surface of the seat post 10 to form a rear opening 131 in the rear part of the outer surface of the seat post 10. A connecting hole 132 is formed between the pressing recess 13 and the head hole 12 for the pressing recess 13 to communicate with the head hole 12 via the connecting hole 132.

With reference to FIGS. 3 to 5, the pressing assembly 20 is mounted in the pressing recess 13 via the rear opening 131. The pressing assembly 20 comprises two pressing blocks 22 and a pressing bolt 23. The pressing blocks 22 each respectively have a threaded hole 221 in a thread direction reverse to the thread direction of the other threaded hole. Each pressing block 22 has a concave pressing surface 222 formed on a top of the pressing block 22 and having a shape corresponding to the shape of the inner surface of the head hole 12. The concave pressing surface 222 of each pressing block 22 may be a rough surface and have multiple teeth, net notches or protrusions to increase the pressing effect provided by the pressing blocks 20. The pressing bolt 23 has two threaded segments 232 formed respectively on two ends of the pressing bolt 23, each of the two threaded segments 232 respectively having a thread direction reverse to the thread direction of the other threaded segment 232, and respectively screwed with the threaded holes 221 in the pressing blocks 22. When the pressing bolt 23 is rotated, the pressing blocks 22 will move toward each other or away from each other.

Figure 6:
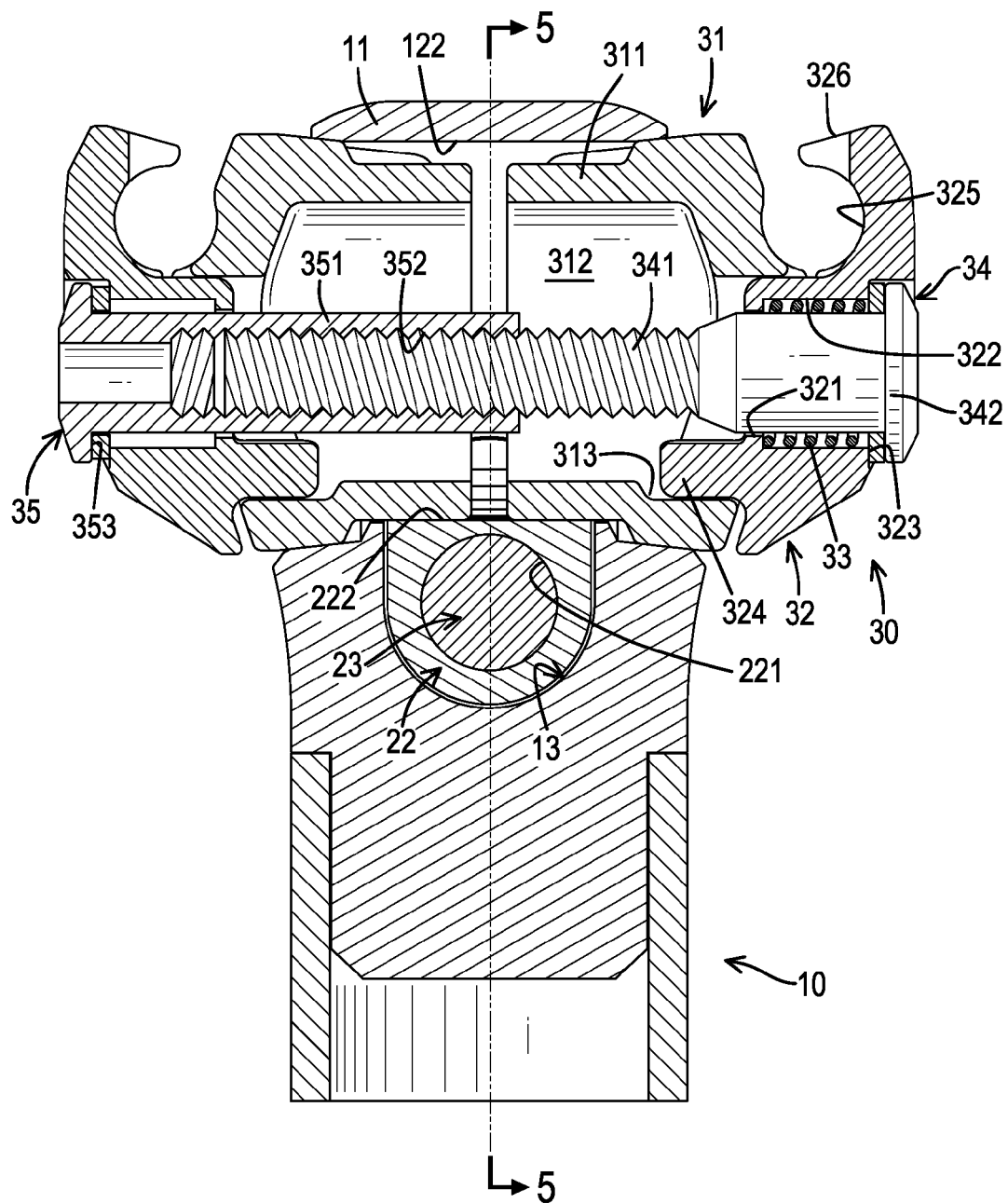
FIG. 6 is an enlarged front view in partial section of the clamping device along the line 6-6 in FIG. 5.

With reference to FIGS. 2, 3 and 6, the clamping assembly 30 is mounted on the post head 11 and comprises two clamping bases 31, two clamping caps 32, a clamping bolt assembly, and a spring 33. The clamping bases 31 each respectively have a structure symmetrical to an axis of the seat post 10. Each clamping base 31 has a clamping block 311, a through hole 312, a positioning recess 313, a rod clamping recess 314, and a limiting block 315. The clamping block 311 is inserted into one of the ends of the head hole 12 in the post head 11 and is conical corresponding to the gradually increased diameter of the corresponding end of the head hole 12. Accordingly, the clamping bases 31 are mounted respectively on two ends of the post head 11 with the clamping blocks 311 respectively inserted into the two ends of the head hole 12. The through hole 312 is laterally defined through the clamping base 31. The positioning recess 313 is defined in an inner surface of the through hole 312. The rod clamping recess 314 is formed in the clamping base 31 to clamp a rod 51 of a bicycle saddle. The limiting block 315 is formed on and protrudes from the clamping block 311 and is engaged in the limiting recess 122 in the post head 11.

The clamping caps 32 are attached respectively to the outer sides of the clamping bases 31 opposite each other. Each clamping cap has a bolt hole 321, a positioning protrusion 324, a rod clamping recess 325, and a guiding surface 326. The bolt hole 321 is defined through the clamping cap 32 and is aligned with the through hole 312 of the corresponding clamping base 31. The positioning protrusion 324 is formed on a side of the clamping cap 32 facing the corresponding clamping base 31 and engaging in the positioning recess 313 in the corresponding clamping base 31. With the engagement between the positioning protrusions 324 and the positioning recesses 313, the clamping caps 32 can be kept from rotating during the assembling or the adjusting process of the clamping device. The rod clamping recess 325 is formed in the clamping cap 32 to clamp the rod 51 of the bicycle saddle in cooperation with the rod clamping recess 314 in the corresponding clamping base 31. Accordingly, the rods 51 of the bicycle saddle can be held in position by the rod clamping recesses 314, 325 of the clamping bases 31 and the clamping caps 32. One of the clamping caps 32 has a spring recess 322 defined in a side of the clamping cap 32 opposite the other clamping cap 32. The spring recess 322 has an annular abutting flange 323 formed in the spring recess 322. The guiding surface 326 is formed on an outer surface of the rod clamping recess 325.

The clamping bolt assembly comprises a fixing bolt 34 and a fixing sleeve 35. The fixing bolt 34 has a threaded rod 341 and a bolt head 342. The bolt head 342 is formed on one end of the threaded rod 341 and has a diameter larger than a diameter of the threaded rod 341. The fixing sleeve 35 has a sleeve body 351, a sleeve head 353, and a threaded hole 352. The sleeve head 353 is formed on one end of the sleeve body 351 and has a diameter larger than a diameter of the sleeve body 351. The threaded hole 352 is defined in one end of the sleeve body 351 opposite the sleeve head 353 and is screwed with the threaded rod 341 of the fixing bolt 34. Alternatively, the clamping bolt assembly may be a combination of bolt and nut or a quick release device to lock the components of the clamping assembly 30.

The spring 33 is mounted around the threaded rod 341 of the fixing bolt 34, is mounted in the spring recess 322, and abuts the abutting flange 323.

With reference to FIGS. 3, 5 and 6, to assemble the clamping device, the pressing bolt 23 of the pressing assembly 20 is screwed with the threaded holes 221 in the pressing blocks 22, and the pressing assembly 20 is mounted in the pressing recess 13 via the rear opening 131. The pressing surfaces 222 of the pressing block 22 are formed as a V-shaped arrangement in the head hole 12. Then, the clamping blocks 311 of the clamping base 31 are respectively inserted into the ends of the head hole 12, and the clamping caps 32 are attached to the outer sides of the clamping base 31. The fixing bolt 34 is mounted through the spring 33, and the fixing bolt 34 and the fixing sleeve 35 are mounted respectively through the bolt holes 321 in the clamping caps 32 and the through holes 312 in the clamping bases 31 and are screwed with each other by the threaded rod 341 and the threaded hole 352. The bolt head 342 and the sleeve head 353 respectively abut the clamping caps 32. With the connection between the fixing bolt 34 and the fixing sleeve 35, the clamping device is assembled. The spring 33 is compressed between the annular abutting flange 323 in the clamping cap 32 and the bolt head 342 of the fixing bolt 34.

Figure 7:
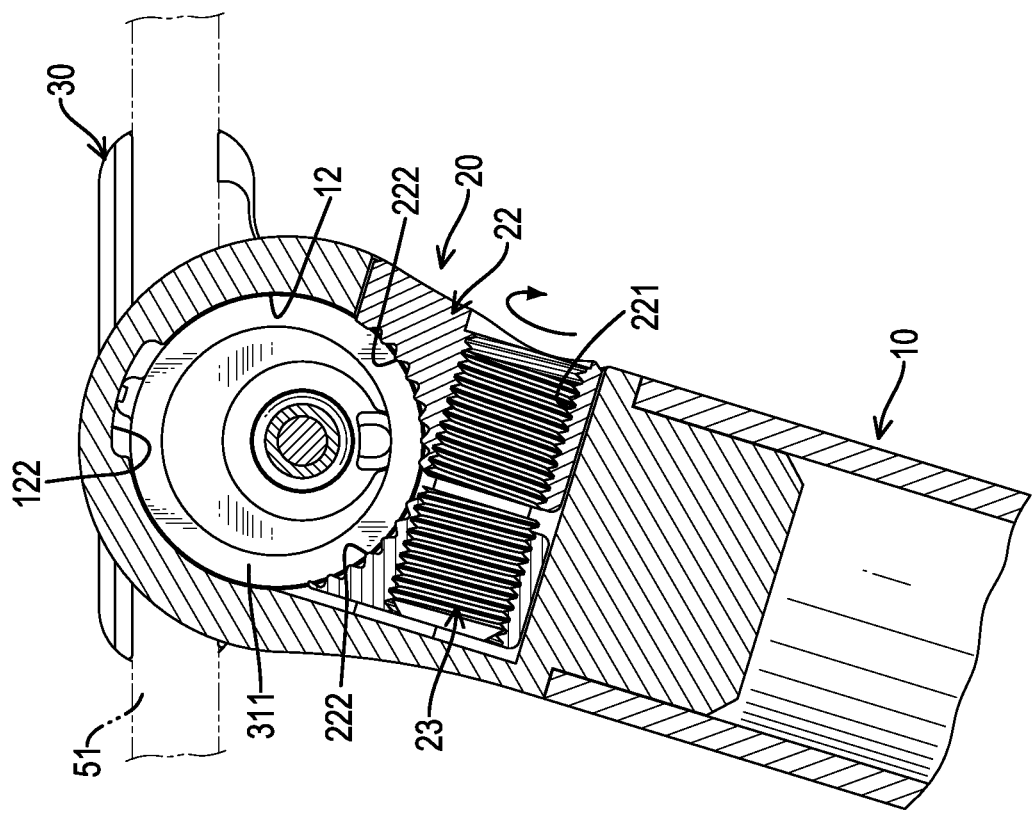
FIG. 7 shows enlarged operational side views in partial section of the clamping device in FIG. 1.
Figure 7:
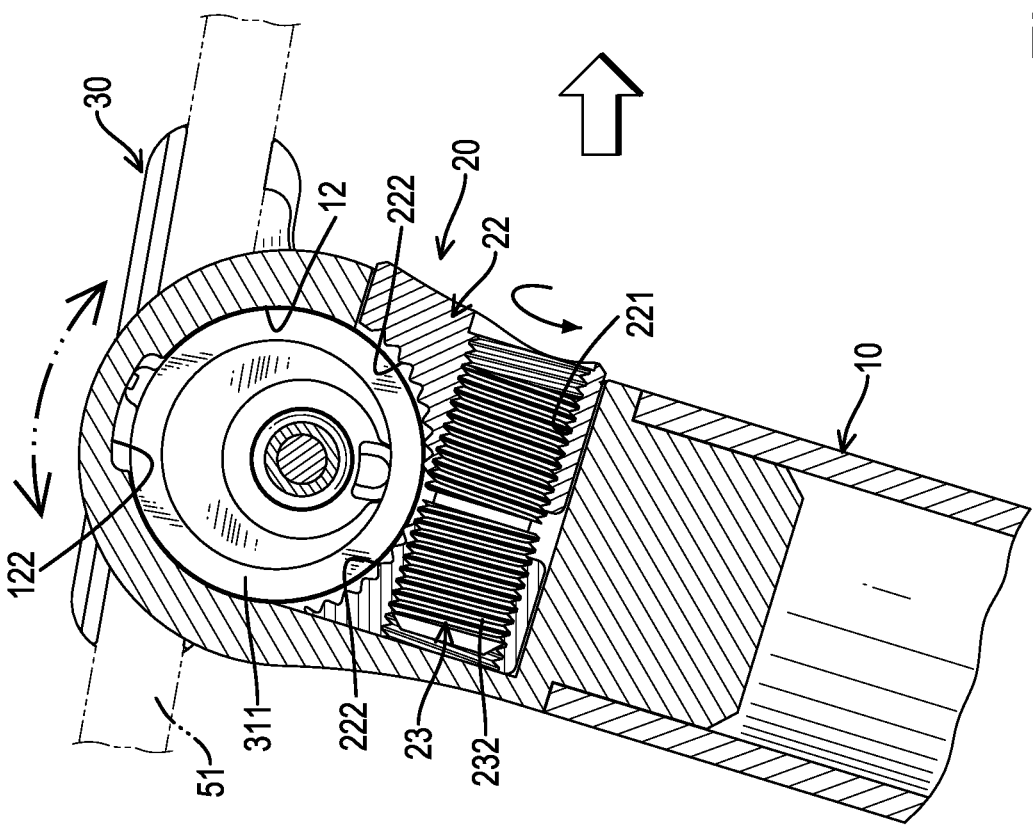
Figure 8:
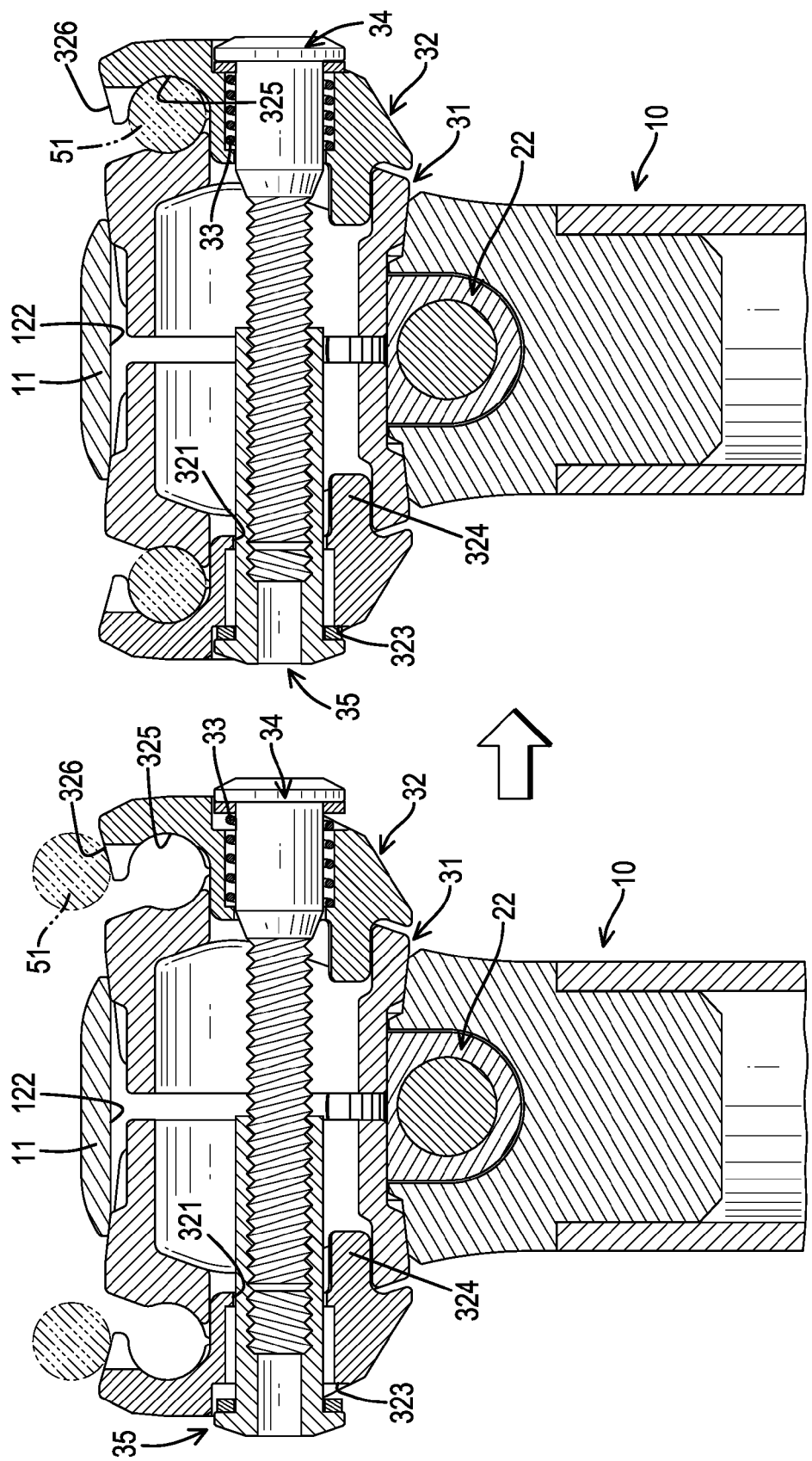
FIG. 8 shows enlarged operational front views in partial section of the clamping device in FIG. 1.

With reference to FIGS. 3, 7 and 8, to assemble the clamping device with the rod of the bicycle saddle, the fixing bolt 34 and the fixing sleeve 35 are slightly released. With the engagement of the positioning recesses 313 and the positioning protrusions 324, the clamping caps 32 can be kept from rotating during the assembling process or the adjusting process. With the compressed spring 33, the spring 33 can provide a force to the corresponding clamping cap 32 to abut against the corresponding clamping base 31. With the guiding surfaces 326, the rods 51 of the bicycle saddle can be pushed directly and respectively into the corresponding rod clamping recess 314, 325. Therefore, to assemble the saddle with the clamping device is easy and convenient.

With reference to FIGS. 5 and 6, the rod 51 of the bicycle saddle is clamped by the clamping assembly 30, the clamping assembly 30 is pressed by the V-shaped arrangement of the pressing surface 222 on the pressing block 22, and the clamping force applied to the saddle can be enhanced so that the safety of using the bicycle saddle can be improved.

With reference to FIGS. 5 and 7, to adjust the angle of the bicycle saddle, the pressing bolt 23 is rotated to move the pressing blocks 22 away from each other in a distance to release the clamping assembly 30. Accordingly, the angle of the bicycle saddle can be adjusted. During the adjusting process, the clamping assembly 30 keeps clamping the rod 51 of the bicycle saddle tightly, so the position of the bicycle saddle will not be changed. With the arrangement of the limiting recess 122 in the head hole 12 and the limiting blocks 315 on the clamping base 31, the adjusting range of the bicycle saddle can be maximized. The clamping assembly 30 can be kept from rotating during the adjusting process, so the safety of the clamping device can be improved.

With reference to FIGS. 6 and 8, to adjust the horizontal position of the bicycle saddle, the clamping bolt assembly is slightly released, and the rods 51 of the bicycle saddle can be released. Consequently, the horizontal position of the bicycle saddle can be adjusted. During the adjusting process, the pressing assembly 20 keeps pressing the clamping assembly 30 tightly, so the angle of the bicycle saddle and the clamping assembly 30 will not be changed. With reference to FIGS. 7 and 8, with the arrangement of the pressing assembly 20 and the clamping assembly 30, the angle and the horizontal position of the bicycle saddle can be individually adjusted. To adjust the angle and the position of the bicycle saddle is easy and convenient.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A clamping device for a bicycle saddle comprising:
a seat post having
a post head formed on a top of the seat post and having a head hole formed through the post head;
a clamping assembly mounted on the post head and having
two clamping bases, each clamping base having
an outer side, the outer sides of the two clamping bases opposite each other;
a clamping block inserted into one of two ends of the head hole;
a through hole defined through the clamping base; and
a rod clamping recess defined in the clamping base;
two clamping caps attached respectively to the outer sides of the clamping bases, and each clamping cap having
a bolt hole defined through the clamping cap; and
a rod clamping recess defined in the clamping cap and corresponding in position to the rod clamping recess of a corresponding one of the clamping bases, wherein one of the clamping caps further has a spring recess formed in a side of the clamping cap opposite the other clamping cap, and the spring recess has an annular abutting flange formed in the spring recess; and
a clamping bolt assembly comprising a fixing bolt, a fixing sleeve screwed with the fixing bolt, and a spring, wherein
the fixing bolt and the fixing sleeve are mounted respectively through the bolt holes in the clamping caps and the through holes in the clamping base;
the spring is mounted around the fixing bolt and abutting the annular abutting flange of the spring recess of the clamping cap in which the spring recess is defined;
each clamping base further has a positioning recess defined in an inner surface of the through hole of the clamping base; and
each clamping cap further has a positioning protrusion formed on a side of the clamping cap facing a corresponding clamping base and engaging the positioning recess in the corresponding clamping base.

2. The clamping device as claimed in claim 1, wherein each clamping cap further has a guiding surface formed on an outer surface of the rod clamping recess of the clamping cap.

3. The clamping device as claimed in claim 2, wherein
the head hole has a diameter gradually increasing from a middle section respectively to the ends of the head hole; and
the clamping blocks of the clamping bases are conical.

4. The clamping device as claimed in claim 3, wherein
the head hole further has a limiting recess defined in an inner surface of the head hole; and
each clamping base further has a limiting block formed on and protruding from the clamping block and engaged in the limiting recess in the post head.

5. The clamping device as claimed in claim 1, wherein
the head hole further has a limiting recess defined in an inner surface of the head hole; and
each clamping base further has a limiting block formed on and protruding from the clamping block and engaged in the limiting recess in the post head.

6. The clamping device as claimed in claim 1, wherein
the post head further has a pressing recess defined in the seat post and communicating with the head hole; and
a pressing assembly is mounted in the pressing recess.

7. The clamping device as claimed in claim 6, wherein
the pressing recess has a rear opening defined through an outer surface of the seat post;
a connecting hole is formed between the pressing recess and the head hole for the pressing recess to communicate with the head hole via the connecting hole;
the pressing assembly has
two pressing blocks, each pressing block having
a threaded hole in a thread direction reverse to the thread direction of the other threaded hole;
a concave pressing surface formed on a top of the pressing block and having a shape corresponding to the shape of an inner surface of the head hole;
a pressing bolt having two threaded segments formed respectively on two ends of the pressing bolt, each of the two threaded segments respectively having a thread direction reverse to the thread direction of the other threaded segment, and respectively screwed with the threaded holes in the pressing blocks.

8. The clamping device as claimed in claim 7, wherein the pressing recess is located below the head hole.

9. A clamping device for a bicycle saddle comprising:
a seat post having
a post head formed on a top of the seat post and having a head hole formed through the post head;
a clamping assembly mounted on the post head and having
two clamping bases, each clamping base having
an outer side, the outer sides of the two clamping bases opposite each other;
a clamping block inserted into one of two ends of the head hole;
a through hole defined through the clamping base; and
a rod clamping recess defined in the clamping base;
two clamping caps attached respectively to the outer sides of the clamping bases, and each clamping cap having
a bolt hole defined through the clamping cap; and
a rod clamping recess defined in the clamping cap and corresponding in position to the rod clamping recess of a corresponding one of the clamping bases, wherein one of the clamping caps further has a spring recess formed in a side of the clamping cap opposite the other clamping cap, and the spring recess has an annular abutting flange formed in the spring recess; and a clamping bolt assembly comprising a fixing bolt, a fixing sleeve screwed with the fixing bolt, and a spring, wherein the fixing bolt and the fixing sleeve are mounted respectively through the bolt holes in the clamping caps and the through holes in the clamping base;

the spring is mounted around the fixing bolt and abutting the annular abutting flange of the spring recess of the clamping cap in which the spring recess is defined;

the head hole further has a limiting recess defined in an inner surface of the head hole;

each clamping base further has a limiting block formed on and protruding from the clamping block and engaged in the limiting recess in the post head;

the post head further has a pressing recess defined in the seat post and communicating with the head hole; and a pressing assembly is mounted in the pressing recess.

10. The clamping device as claimed in claim 9, wherein
the pressing recess has a rear opening defined through an outer surface of the seat post;

a connecting hole is formed between the pressing recess and the head hole for the pressing recess to communicate with the head hole via the connecting hole;

the pressing assembly has two pressing blocks, each pressing block having a threaded hole in a thread direction reverse to the thread direction of the other threaded hole;

a concave pressing surface formed on a top of the pressing block and having a shape corresponding to the shape of an inner surface of the head hole;

a pressing bolt has two threaded segments formed respectively on two ends of the pressing bolt, each of the two threaded segments respectively having a thread direction reverse to the thread direction of the other threaded segment, and respectively screwed with the threaded holes in the pressing blocks.

11. The clamping device as claimed in claim 10, wherein the pressing recess is located below the head hole.

\* \* \* \* \*